United States Patent
Bhattacharjee et al.

(10) Patent No.: US 8,219,609 B1
(45) Date of Patent: Jul. 10, 2012

(54) ESTABLISHING A STATEFUL ENVIRONMENT FOR A STATELESS ENVIRONMENT

(75) Inventors: Ratnadeep Bhattacharjee, Bangalore (IN); William A. Edwards, Bedford, MA (US)

(73) Assignee: Oracle America, Inc., Redwood City, CA (US)

( * ) Notice: Subject to any disclaimer, the term of this patent is extended or adjusted under 35 U.S.C. 154(b) by 1392 days.

(21) Appl. No.: 10/847,780

(22) Filed: May 17, 2004

(51) Int. Cl.
*G06F 15/16* (2006.01)
*G06F 15/173* (2006.01)

(52) U.S. Cl. ............... 709/203; 709/225; 726/2; 726/5

(58) Field of Classification Search .......... 709/217–219, 709/202–203, 223–229; 726/1–10, 26–30
See application file for complete search history.

(56) References Cited

U.S. PATENT DOCUMENTS

| | | | |
|---|---|---|---|
| 7,039,670 B2 * | 5/2006 | Hubbard et al. | 709/201 |
| 7,275,085 B1 * | 9/2007 | Tran | 709/217 |
| 7,346,667 B2 * | 3/2008 | Ashcroft et al. | 709/219 |
| 7,426,730 B2 * | 9/2008 | Mathews et al. | 718/104 |
| 7,493,402 B2 * | 2/2009 | McCarty et al. | 709/229 |
| 7,590,731 B2 * | 9/2009 | Howard et al. | 709/225 |
| 7,774,271 B1 * | 8/2010 | Edwards et al. | 705/38 |
| 2002/0116452 A1 * | 8/2002 | Johnson et al. | 709/203 |
| 2003/0084170 A1 * | 5/2003 | de Jong et al. | 709/229 |
| 2004/0068572 A1 * | 4/2004 | Wu | 709/229 |
| 2004/0123144 A1 * | 6/2004 | Chan et al. | 713/201 |
| 2004/0148343 A1 * | 7/2004 | Mottes | 709/203 |
| 2004/0168059 A1 * | 8/2004 | Patrick | 713/168 |
| 2005/0015601 A1 * | 1/2005 | Tabi | 713/182 |
| 2005/0125677 A1 * | 6/2005 | Michaelides | 713/185 |
| 2007/0118648 A1 * | 5/2007 | Millefiorini et al. | 709/225 |

* cited by examiner

*Primary Examiner* — Joshua Joo
(74) *Attorney, Agent, or Firm* — Martine Penilla Group, LLP

(57) ABSTRACT

Provided is a method and an apparatus for maintaining state information between a stateless environment and a stateful environment. Specifically, a front-end process operates a stateless environment, such as providing web services via the HyperText Transfer Protocol. Because HTTP is inherently stateless, a back-end process operates a stateful environment by managing multiple modules. Some of the modules can be login modules that request login information for an authentication process. The authentication process can be the Java Authentication and Authorization Service (JAAS). The back-end process accumulates state information and transmits the state information to the front-end process when modules request further information. By managing the authentication process from the back-end process, the stateful environment is established for the stateless environment.

19 Claims, 5 Drawing Sheets

ESTABLISHING A STATEFUL ENVIRONMENT FOR A STATELESS ENVIRONMENT

BACKGROUND

Typically, in a stateful environment, there is a mechanism to maintain state information during a session between two computer systems. Any state information communicated between two computer systems, such as a client computer and a server computer, can be preserved. However, in a stateless environment, there is no mechanism to maintain the state information. Further, each request from the client computer to the server computer is independent of another request, and accordingly, any state information of a first session is not available to a second session.

In an exemplary stateless environment of a login process, if the login process is required for each request to the server computer, then the login process is executed for each request. Multiple login processes for the same client computer is inefficient because the server computer manages multiple login processes. Further, the multiple login processes produce extra traffic over a network connection between the client computer and the server computer.

One possible solution to maintaining state information in a stateless environment, such as the World Wide Web, is to provide a database connected to the server computer. Thus, when a request is generated by clicking a link on a web browser from the client computer, any state information of the HTTP session is stored in the database. Subsequent requests can then access the state information stored in the database.

SUMMARY

Embodiments of the present invention provide a method and an apparatus of establishing a stateful environment for a stateless environment. In one exemplary embodiment, a front-end can operate a stateless environment. Concurrently, a back-end can operate a stateful environment. Both the front-end and the back-end can exist on the same computer system, permitting the maintenance of state information between sessions of the computer system. It should be appreciated that the present invention can be implemented in numerous ways, such as a process, an apparatus, a system, a device or a method on a computer readable medium. Several inventive embodiments of the present invention are described below.

One embodiment of a system of establishing a stateful environment for a stateless environment comprises a stateless thread of a server and a stateful thread of the server. The stateful thread is configured to communicate with the stateless thread. Further, the system includes a transient object. The transient object has temporary information, such that the transient object is in communication between the stateless thread and the stateful thread. The system also includes a persistent object. The persistent object has an accumulation of the temporary information from the transient object. Further, the temporary information is capable of being communicated to the stateless thread.

Another embodiment of a method of establishing a stateful environment for a stateless environment comprises receiving information that is processed by a stateless thread and storing the information temporarily in a transient object. The information is capable of being communicated to a stateful thread. Further, the method includes accessing the information stored in the transient object from the stateful thread and transmitting the information to a persistent object of the stateful thread. The persistent object accumulates the information from the transient object, such that the information is capable of being communicated to the stateless thread.

In an embodiment of a networked system for establishing a stateful environment for a stateless environment, the networked system comprises a web server having a login presentation thread. The login presentation thread is capable of communicating temporary information to a transient object. Further, the networked system includes a login controller thread of the web server, such that the login controller thread is in communication with the login presentation thread. The transient object is capable of communicating the temporary information between the login presentation thread and the login controller thread. The networked system also includes a persistent object that is accessible by the web server. The persistent object is in communication with the login controller thread. Further, the persistent object accumulates the temporary information, such that the temporary information is capable of being communicated to the login presentation thread.

Other aspects of the invention will become apparent from the following detailed description taken in conjunction with the accompanying drawings, which illustrates by way of example, the principles of the invention.

DETAILED DESCRIPTION

The following embodiments describe a method and an apparatus of establishing a stateful environment for a stateless environment. For example, in one embodiment, any type of state information can be maintained for the stateless environment, as long as the back-end process accumulates the state information. In another exemplary embodiment, state information such as authentication state information, can be maintained in the stateless environment by accumulating the state information with a back-end process that performs the authentication. It will be obvious, however, to one skilled in the art, that the present invention may be practiced without some or all of these specific details. In other instances, well known process operations have not been described in detail in order not to unnecessarily obscure the present invention.

Figure 1:
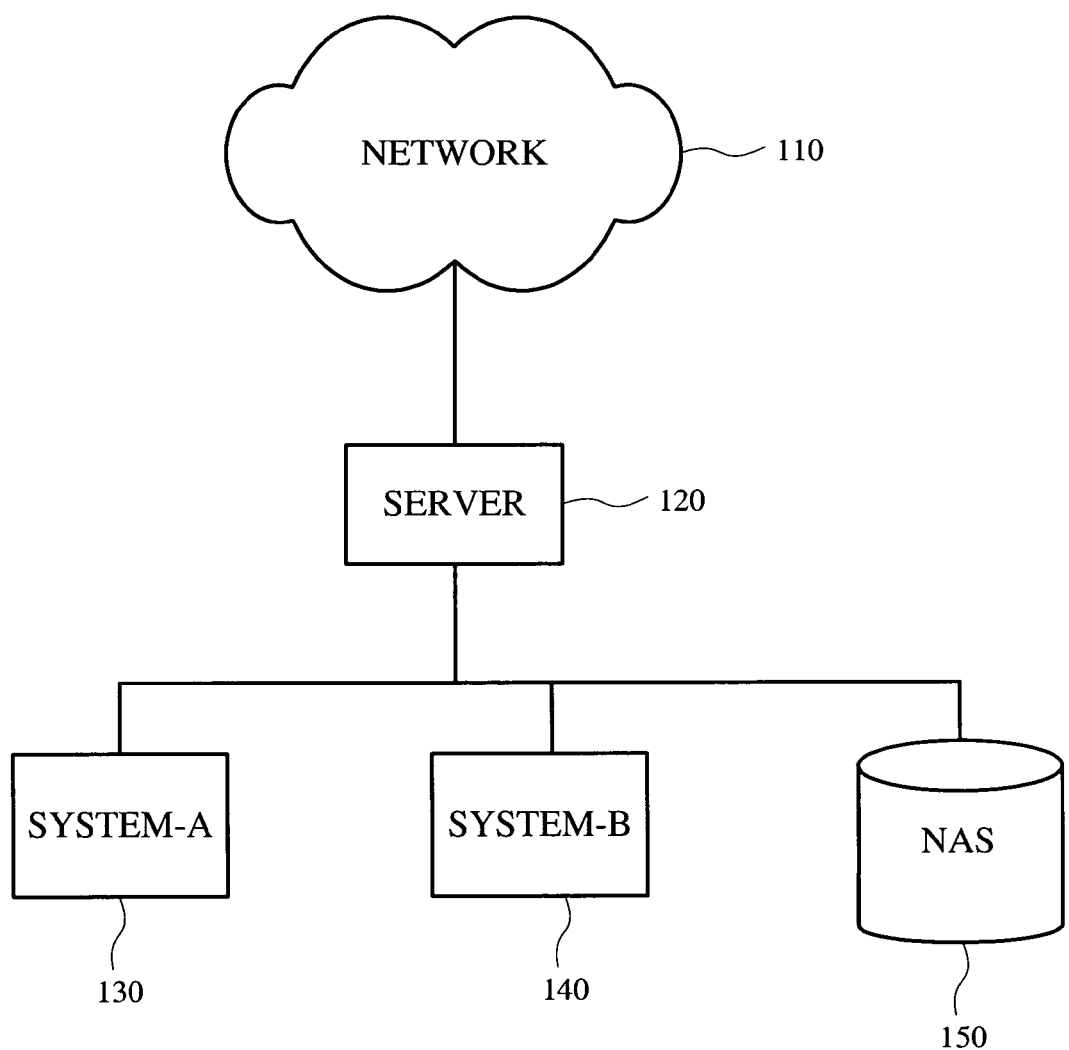
FIG. 1 is a diagram illustrating a networked system operating in a stateless environment and a stateful environment, in accordance with an embodiment of the invention.

FIG. 1 is a diagram illustrating a networked system operating in the stateless environment and the stateful environment, in accordance with an embodiment of the invention. Connected to a network 110 is a server 120, a system-A 130, a system-B 140, and a network attached storage (NAS) 150. An exemplary stateless environment exists when the network 110 is the Internet. Specifically, HTTP requests, or any other request using any protocol that does not preserve state information during a session, can arrive via the network 110. The request is received by the server 120, which provides a stateful environment. The establishment of the stateful environment is described in detail in conjunction with the illustrations of the system of FIGS. 2 through 4.

The server 120, the system-A 130, and the system-B 140 can be any type of computer system. Further, the NAS 150 is computer system dedicated to file sharing. For example, the server 120 can include components (not shown), such as a processor, a memory, storage devices, and network interfaces. A system bus (not shown) connects the components to enable communication among the components. Further, each processor can include one or more cores (not shown) having multiple execution units and caches. Accordingly, the processor with multiple cores can be called a "multi-core" processor. In other exemplary embodiments, the server 120 can have more than one processor.

The components of the server 120 are managed by an operating system (OS). For example, exemplary operating systems can include any version of Unix®, any version of Microsoft Windows®, and any version of the Macintosh® OS. To those of ordinary skill in the art, the list of operating systems is not exhaustive and includes any operating system used to manage the components of a computer system. The operating system can also manage any processes/threads operating on the server 120. Accordingly, to one of ordinary skill in the art, any operating system of the server 120 is possible, as long as the operating system manages multiple threads of the embodiments described herein.

Figure 2:
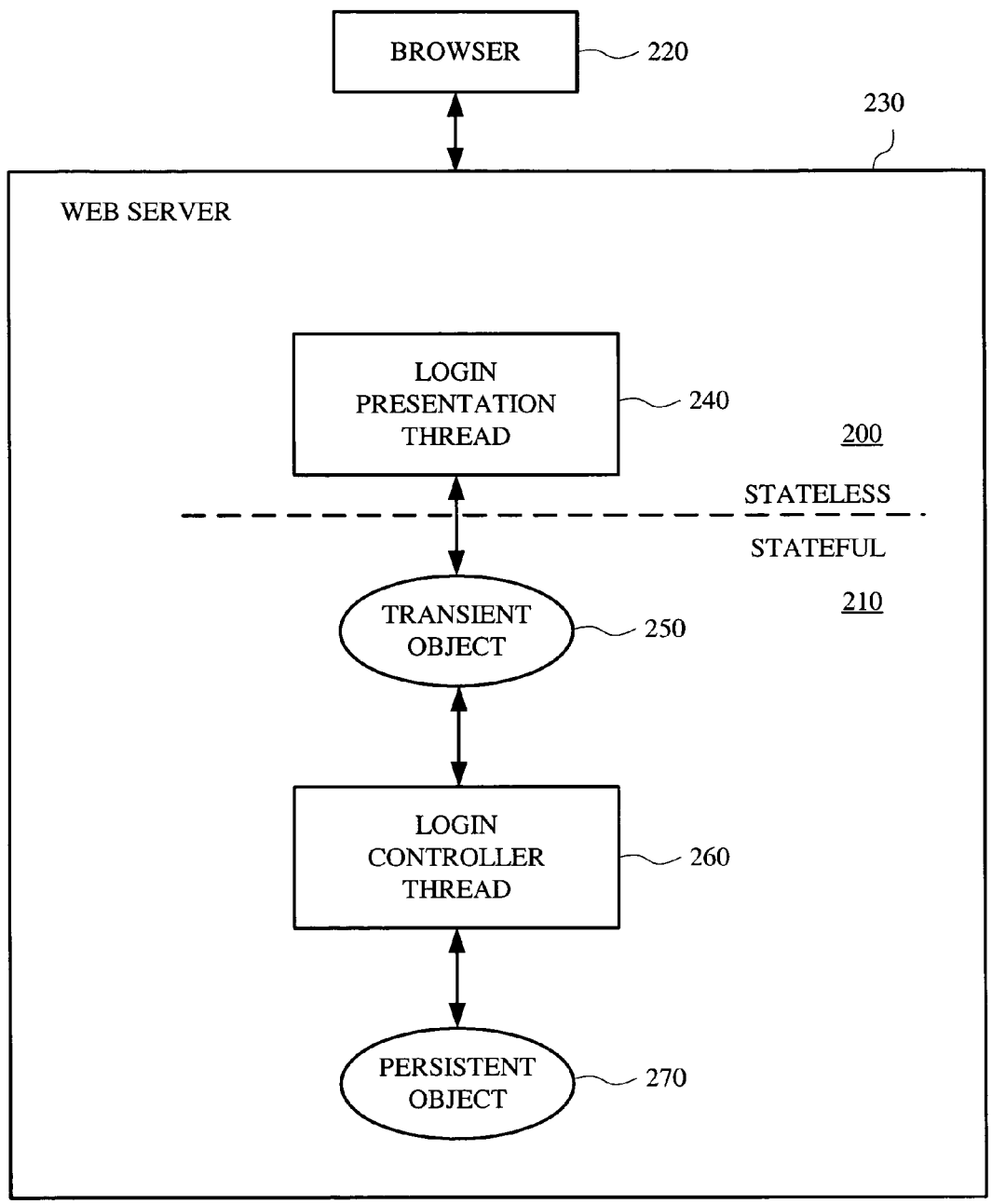
FIG. 2 is a diagram illustrating a web server operating in a stateless environment and a stateful environment, in accordance with an embodiment of the invention.

FIG. 2 is a diagram illustrating a web server operating in the stateless environment and the stateful environment, in accordance with an embodiment of the invention. For example, a browser 220 operating from a first location on the network 110 and a web server 120 operating from a second location on the network 110 can communicate with one another. The browser 220 and the web server 230 are computer systems having operating systems, as previously described. The browser 220 originates requests that are transmitted to the web server 230 via HTTP. Thus, the requests occur in a stateless environment 200.

Operating on the web server 230 are a login presentation thread 240, a transient object 250, a login controller thread 260, and a persistent object 270. The transient object 250, the login controller thread 260, and the persistent object 270 of the web server 230 are the elements that establish a stateful environment 210. Specifically, if a front-end, such as the login presentation thread 240 operates in the stateless environment 200, and a back-end, such as the login controller thread 260 operates in the stateful environment 210, then both threads can operate on the web server 230 to establish the stateful environment 210. Although illustrated as operating on the web server 230, any computer system connected to the web server 230 can operate the login presentation thread 240, the transient object 250, the login controller thread 260, and the persistent object 270.

During operation, a stateless thread, such as the login presentation thread 240, is configured to communicate with a stateful thread, such as the login controller thread 260. The transient object 250 can store temporary information that can be communicated between the stateless thread and the stateful thread. Further, the persistent object 270 can accumulate the temporary information from the transient object 250 because the stateful thread is capable of communicating the temporary information to the persistent object 270. Consequently, the temporary information accumulated in the persistent object 270 is capable of being communicated to the stateless thread to establish the stateful environment 210. Specifically, if the login presentation thread 240 communicates with the browser 220, then any information of the persistent object 270 can be transmitted to the browser 220.

Temporary information stored by the transient object 250 is transient and is not accumulated. However, as the persistent object 270 accumulates the temporary information, the information is no longer transient and is available to any session initiated between the browser 220 and the web server 230.

In one exemplary embodiment, the browser 220 can request access to the web server 230. The login presentation thread 240 receives the request for access and responds by requesting login information from the browser 220. The browser 2220 then responds with login information. The login information is temporarily stored in the transient object 250. Subsequently, the login information is authenticated by the login controller thread 260 and stored in the persistent object 270.

Any login information obtained from the stateless environment 200 is accumulated in the persistent object 270. Further, the login information temporarily stored in the transient object 250 is not available between sessions. Thus, when the login information is required during multiple sessions between the browser 220 and the web server 230, the login information can be transmitted to the browser 220 from the persistent object 270.

Figure 3:
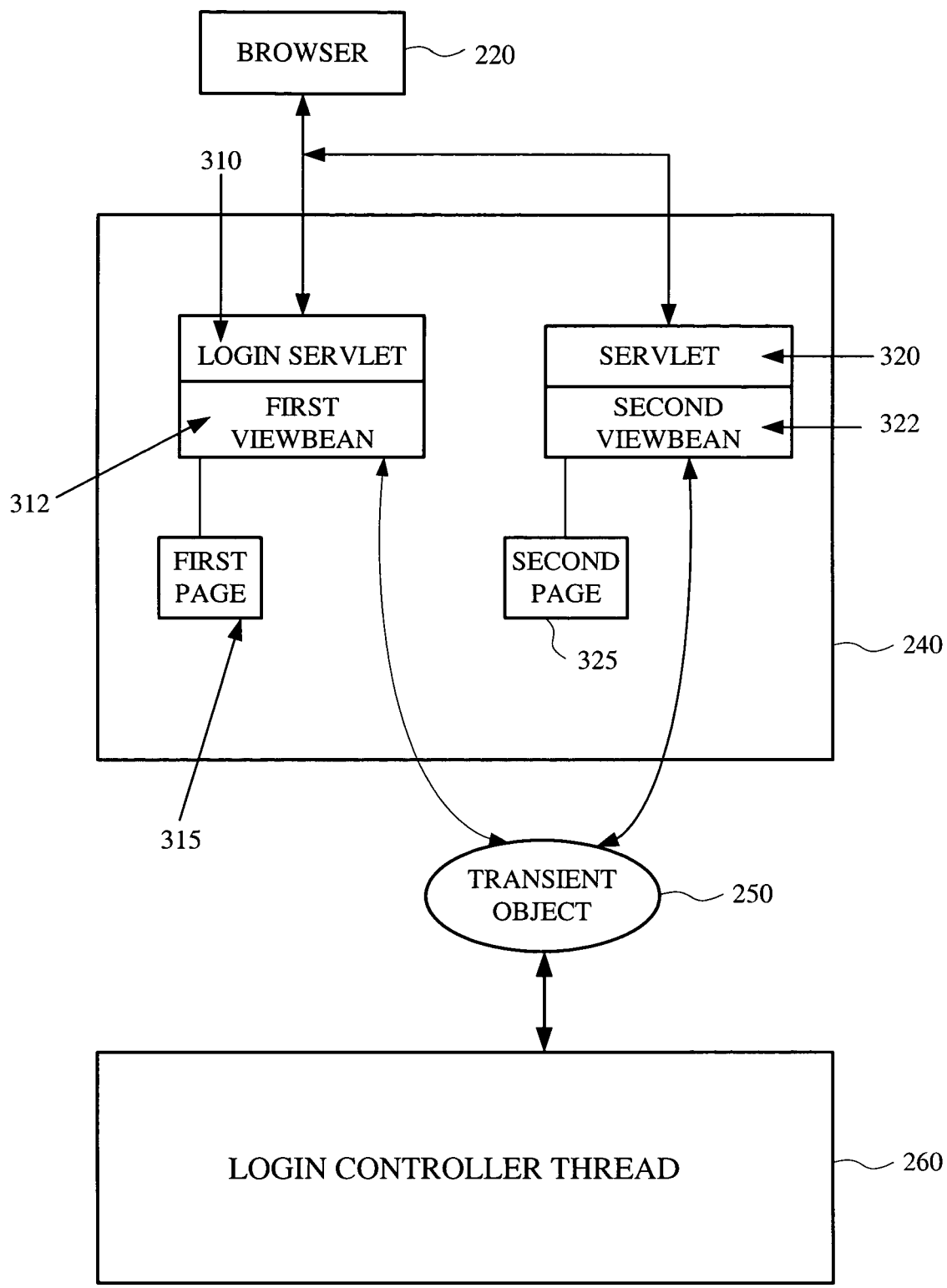
FIG. 3 is a diagram illustrating a login presentation thread, in accordance with an embodiment of the invention.

FIG. 3 is a diagram illustrating the login presentation thread 240, in accordance with an embodiment of the invention. In one embodiment, the browser 220 can initiate an access request to the web server 230. As previously described, the login presentation thread 240 of the stateless environment 200 communicates with the browser 220. Specifically, a login servlet 310 and a first viewbean 312 can communicate with the browser 220 via a first page 315. Further, a servlet 320 and a second viewbean 322 can communicate with the browser 220 via a second page 325. As is well known to those of ordinary skill in the art, servlets are small programs that operate on a server. In one embodiment, the login servlet 312 and the servlet 320 are Java applets that operate on the web server 230. Further, viewbeans are software programs that are produced from other reusable software programs. Viewbeans can render a display by producing pages for the browser 220. Thus, when the browser 220 initiates the access request, the login servlet 310 receives the access request and produces the first page 315 for display on the browser 220 with the first viewbean 312. The first page 315 can include fields for the entry of a login account and a password associated with the login account.

In alternative embodiments, the servlets and viewbeans of FIG. 3 need not be Java-related. For example, objects and methods that perform the actions of servlets and viewbeans are possible. In one exemplary embodiment, an object and methods can render a display by producing pages. Thus, the embodiments disclosed herein are not limited to Java and include other programming paradigms, as long as a stateful environment is established for a stateless environment.

Before producing the first page 315, the login presentation thread 240 transmits the access request to the login controller thread 260. As will be described in FIG. 4, the login controller thread 260 can transmit requests for information via the transient object 250. An exemplary request for information is a request for the login account and the password. Consequently, the first viewbean 312 produces the first page 315 requesting the login account and password information. After entry and submission of the login account and password information on the first page 315 to the web server 230, the first viewbean 312 stores the login account and password information temporarily in the transient object 250. The login controller thread 260 accesses the temporary information in the transient object 250, stores the temporary information, and authenticates the information. Subsequently, the login controller thread 260 may require further information before granting full access to the web server 230.

The login controller thread 260 can initiate a request for further information, such as a role associated with the login account. When initiating the request, any information accumulated by the login controller thread 260 is stored in the transient object 250 for inclusion on the second page 325. Then, the servlet 320 and the second viewbean 322 produce the second page 325 requesting information regarding the role associated with the login account. The second page 325 also includes any accumulated information from the login controller thread 260. This presentation of the accumulated information to the browser 240 is the statefullness of the process for the stateless environment 200.

Figure 4:
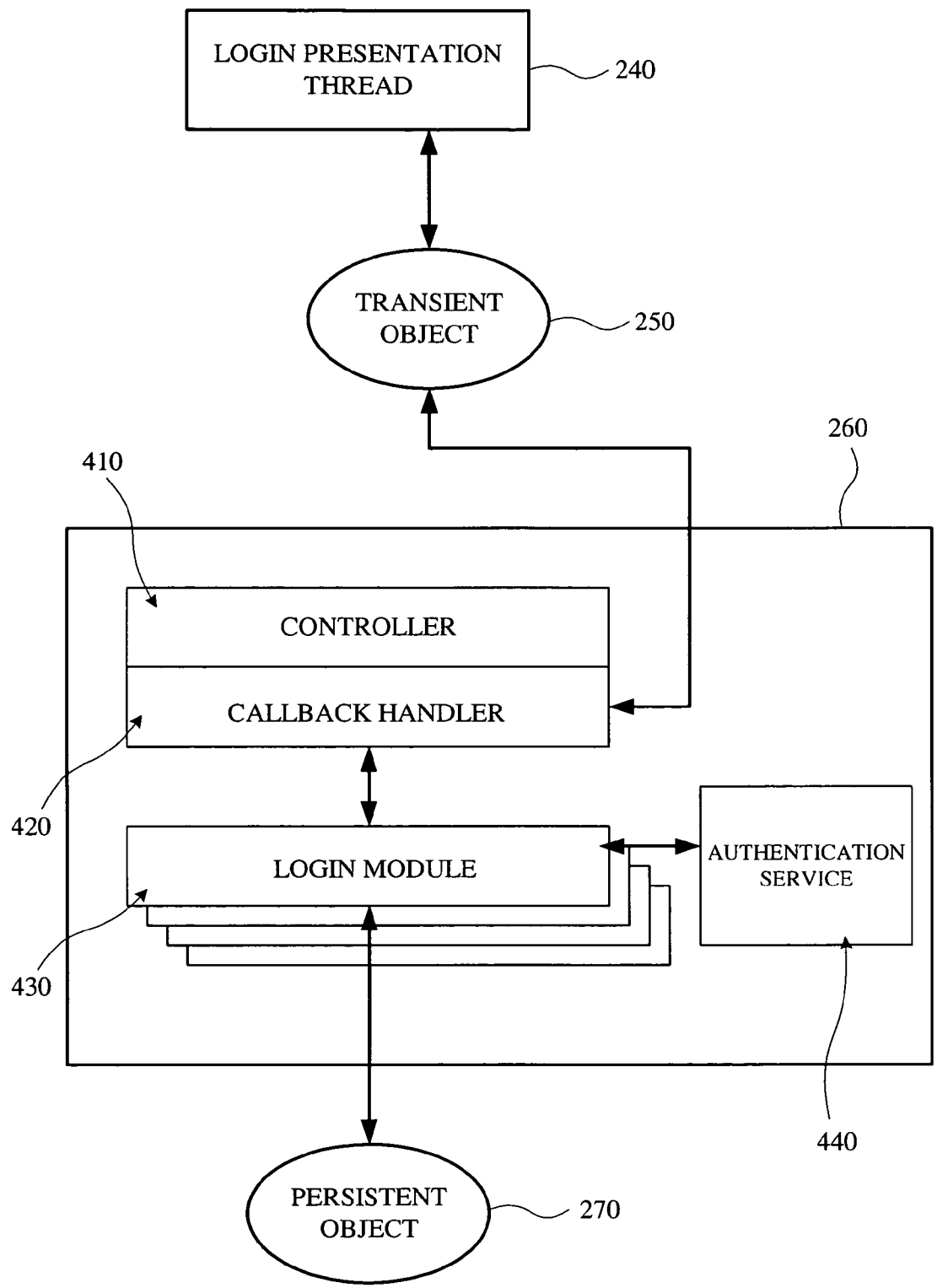
FIG. 4 is a diagram illustrating a login controller thread, in accordance with an embodiment of the invention.

FIG. 4 is a diagram illustrating the login controller thread 260, in accordance with an embodiment of the invention. The login controller thread 260 is coupled to a persistent object 270. The login controller thread 260 includes a controller 410, a callback handler 420 coupled to the transient object 250, a plurality of login modules 430, and an authentication service 440. The controller 410 can be a Java Authentication and Authorization Service (JAAS) controller capable of authenticating and authorizing the login accounts. However, the controller 410 can be any type of service that permits authentication of login accounts as long as the login controller thread 260 accumulates information in the persistent object 270. By accumulating information of the transient object 250 in the persistent object 270, the persistent object 270 provides a state information repository for the stateful environment 210.

The callback handler 420 enables communication between the login modules 430 and the transient object 250. Further, at least one login module 430 is configured to communicate with the authentication service 440. The authentication service 440 is an operating system process that authenticates the login account and password.

Returning to the embodiment described in FIG. 3, when the access request is transmitted to the login controller thread 260, the callback handler 420 of the controller 410 receives the access request. Then, a login module 430 for authenticating the access request executes. The login module 430 requires login account and password information, which is transmitted via the transient object 250 to the login presentation thread 240. As previously described, the first viewbean 312 produces the first page 315 to obtain the login account and password information. After submission of the login account and password information to the web server 230, the information is passed to the login module 430, which communicates and stores the information in the persistent object 270. The login module 430 also executes the authentication service 440 to authenticate the login account and password with the operating system. After authentication, the controller 410 determines if another login module 430 must be executed. For example, a login module 430 may need further information regarding the roles associated with the authenticated login account. Accordingly, another login module 430 seeking role information requests information through the callback handler 420 to the login presentation thread 240.

Along with the request for role information, the login module 430 can also send any information accumulated in the persistent object 270 relating to the login account. Thus, state information is transmitted to the stateless thread in the stateless environment 200 because the login controller thread 260 maintains the state information in the persistent object 270.

The login controller thread 260 drives the login authentication process by executing any amount of login modules 430. Each login module 430 can request additional information, which when received by the login module 430, is accumulated in the persistent object 270. As each request is transmitted to the stateless thread, any accumulated information of the persistent object 270 is the state information that provides the stateful environment 210. Thus, the feedback of information to the browser 220 is the statefullness of the process.

In other embodiments, any number of persistent objects 270 can accumulate information. Further, any number of transient objects 250 can be used to temporarily store information between the stateful thread and the stateless thread. The stateful thread and the stateless thread are also a first portion and a second portion of the authentication process, respectively. Further, any authentication process is possible, as long as a back-end having the login controller thread 260 manages the authentication process.

Figure 5:
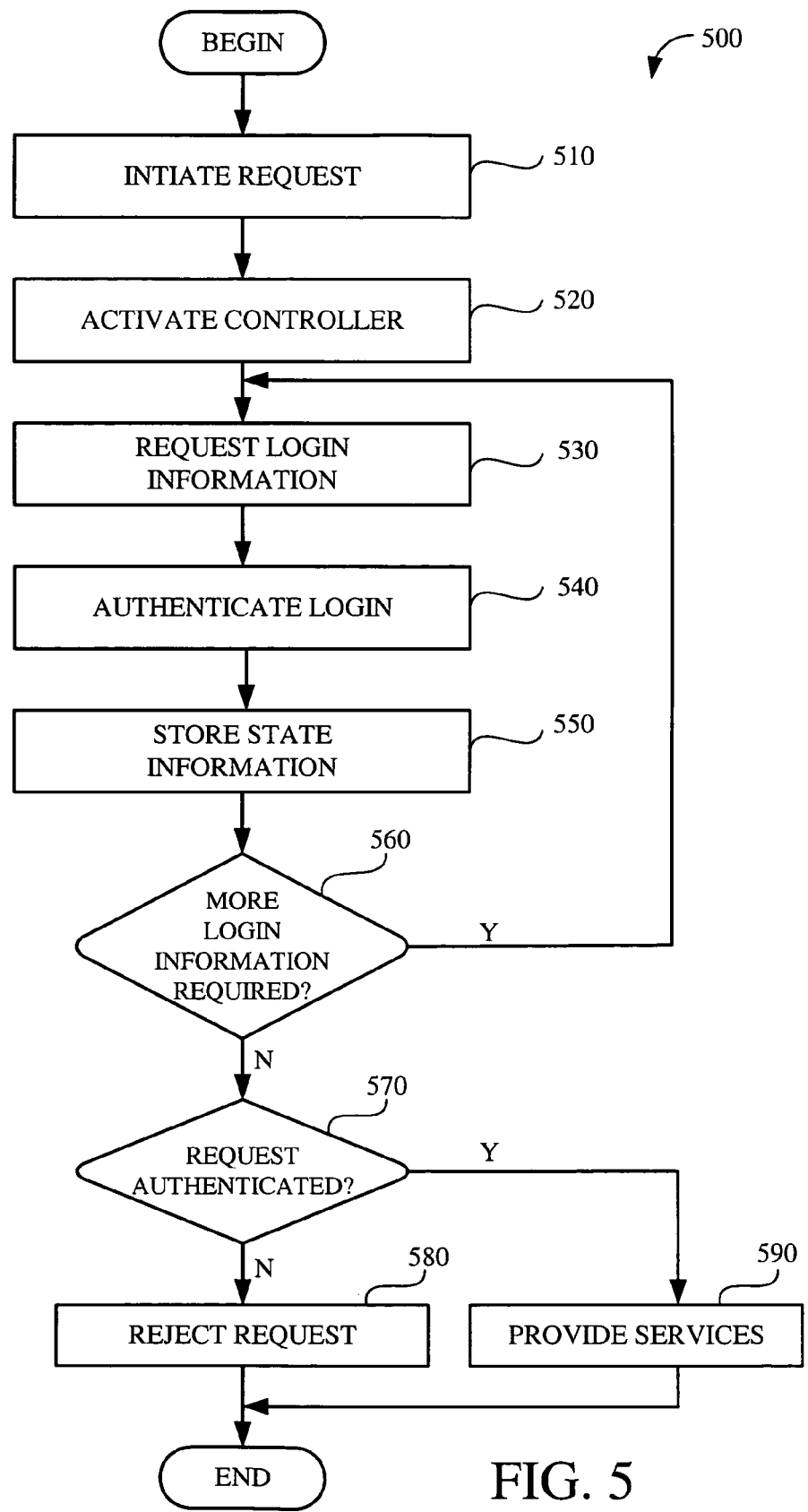
FIG. 5 is a flowchart diagram illustrating an authentication process, in accordance with an embodiment of the invention.

FIG. 5 is a flowchart diagram illustrating an authentication process, in accordance with an embodiment of the invention. An exemplary authentication process 500 begins by the browser 220 initiating an access request in operation 510 to the web server 230. Then, in operation 520, the login controller thread 260 activates the controller 410. In one exemplary embodiment, the controller 410 can be a JAAS controller. Then, in operation 530, a first login module 430 of the login controller thread 260 requests login information. After receiving the login information, the first login module 430 authenticates the login information in operation 540 with the authentication service 440.

Correspondingly, in operation 550, the first login module 430 also stores the login information as state information, in the persistent object 270. If more login information is required after operation 560, then the authentication process 500 returns to operation 530 to request more login information. In one exemplary embodiment, the request for more login information can include any accumulated state information of the persistent object 270. By providing accumulated information from the persistent object 270 and executing any number of login modules 430, the login controller thread 260 establishes the stateful environment 210 for the stateless environment 200.

If more login information is not required, then in operation 570, the controller 410 determines if the access request is authenticated. If the access request is authenticated, then in operation 590, the web server 230 provides services. Alternatively, in operation 580, the web server 230 rejects the access request. In either case, the authentication process 500 ends.

In some embodiments, the authentication process 500 can provide services to any device or process of the web server 230. However, in other embodiments, the authentication process 500 provides services to any device or process accessible from the web server 230. Accordingly, the system-A (FIG. 1), the system-B 140, the NAS 150, and any processes operating on any device accessible from the server 120 can provide services after the authentication process 500.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system of establishing a stateful environment for a stateless environment, the system having a processor and access to memory, comprising:
    a stateless thread of a server communicating with a browser to receive access request to the server and provide a first page requesting authentication information to the browser;
    a stateful thread of the server configured to communicate with the stateless thread;
    a transient object having temporary information received from a user of the browser, the transient object being in communication between the stateless thread and the stateful thread, the temporary information including the requested authentication information; and
    a persistent object having an accumulation of the temporary information from the transient object, wherein the temporary information accumulated within the persistent object is configured to be communicated to the stateless thread for onward transmission to the browser for user authentication,
    wherein the stateful thread further includes a plurality of login modules, the plurality of login modules in communication with the persistent object, each of the plurality of login modules configured to transmit accumulated state information previously received from the user from the persistent object to the transient object through the stateful thread for onward transmission to the browser through the stateless thread every time additional information is requested through the login modules, the additional information requested through the login modules is used to further authenticate the user during an initial user authentication process when information in the persistent object defining user credentials is not sufficient to authenticate the user, wherein the stateful thread, the transient object and the persistent object are managed by an operating system of the system, and wherein establishing a stateful environment for a stateless environment is during the initial user authentication process such that state information is used by other processes in-between sessions, the state information accumulated during the user authentication process is available to multiple sessions initiated between a browser requesting authentication and the server,
    wherein the stateless thread provides to the browser a second page for presentation at the browser, the second page comprising the accumulated state information and a request for information in addition to the requested authentication information from the user for authenticating the user when the requested authentication information is insufficient to access the server.

2. The system of claim 1, wherein the stateless thread includes a viewbean, the viewbean configured to communicate a page having the temporary information communicated by the persistent object.

3. The system of claim 1, wherein the stateless thread includes a login presentation thread, the login presentation thread being a first portion of an authentication process.

4. The system of claim 3, wherein the stateful thread includes a login controller thread, the login controller thread being a second portion of the authentication process.

5. The system of claim 4, wherein the login controller thread communicates with the persistent object.

6. The system of claim 5, wherein at least one of the plurality of login modules communicates with an authentication service, the authentication service configured to authenticate the temporary information communicated during the authorization process.

7. The system of claim 5, wherein at least one of the plurality of login modules communicates the temporary information to the stateless thread.

8. The system of claim 1, wherein the server is a web server having a Java Authentication and Authorization Service (JAAS) controller.

9. A method of establishing a stateful environment for a stateless environment, comprising:
    provide, by a stateless thread, a first page requesting authentication information to a browser;
    receiving information that is processed by the stateless thread, the information received from a user and received from the browser requesting access to a server, the information including the requested authentication information;
    storing the information temporarily in a transient object, the information configured to communicate to a stateful thread;
    accessing the information stored in the transient object from the stateful thread; and transmitting the information to a persistent object of the stateful thread, the persistent object accumulating the information from the transient object, wherein the information accumulated within the persistent object is configured to be communicated to the stateless thread for onward transmission to the browser for user authentication, wherein the stateful thread further includes a plurality of login modules for the access request, the plurality of login modules in communication with the persistent object, each of the plurality of login modules configured to transmit accumulated information previously received from the user from the persistent object to the transient object through the stateful thread for onward transmission to the browser through the stateless thread every time additional information is requested through the login modules, the additional information requested through the login modules is used to further authenticate the user during an initial user authentication process when information in the persistent object defining user credentials is not sufficient to authenticate the user, wherein the stateful thread, the transient object and the persistent object are managed by an operating system of a system, the accumulated information presented at the browser establishes the stateful environment for the stateless environment, and wherein establishing the stateful environment for the stateless environment is during the initial user authentication process such that state information is used by other processes in-between sessions, the state information accumulated during the user authentication process is available to multiple session initiated between a browser requesting user authentication and a server of the system, wherein the stateless thread provides to the browser a second page for presentation at the browser, the second page comprising the accumulated state information and a request for information in addition to the requested authentication information from the user for authenticating the user when the requested authentication information is insufficient to access the server.

10. The method of claim 9, wherein receiving information further includes processing the information with a login presentation thread, the login presentation thread being a portion of the stateless thread.

11. The method of claim 10, wherein processing the information with the login presentation thread further includes transmitting the information to the transient object.

12. The method of claim 9, wherein accessing the information further includes processing the information with a login controller thread, the login controller thread being a portion of the stateful thread.

13. The method of claim 12, wherein processing the information with the login controller thread further includes interfacing one or more of the plurality of login modules to access the information in the transient object.

14. The method of claim 13, wherein interfacing one or more of the plurality of login modules further includes authenticating the information with an authentication service.

15. The method of claim 9, wherein transmitting the information to the persistent object further includes communicating with a viewbean of the stateless thread to present a page.

16. The method of claim 15, wherein communicating with the viewbean of the stateless thread further includes presenting the page and the information.

17. A networked system for establishing a stateful environment for a stateless environment, the networked system having a processor and access to memory, comprising:

a web server having a login presentation thread communicating with a browser to receive access request to the web server and provide a first page requesting authentication information to the browser, the login presentation thread configured to communicate temporary information received from a user of the browser to a transient object, the temporary information including the requested authentication information;

a login controller thread of the web server, the login controller thread in communication with the login presentation thread, wherein the transient object is configured to communicate the temporary information between the login presentation thread and the login controller thread; and a persistent object being accessible by the web server, the persistent object being in communication with the login controller thread, the persistent object accumulating the temporary information from the transient object, wherein the temporary information accumulated within the persistent object is configured to be communicated to the login presentation thread for onward transmission to the browser for user authentication, wherein the login controller thread further includes a plurality of login modules for each access request, the plurality of login modules in communication with the persistent object, each of the plurality of login modules configured to transmit accumulated information previously received from the user from the persistent object to the transient object through the login controller thread for onward transmission to the browser through the login presentation thread every time additional information is requested through the login modules, the additional information requested through the login modules is used to further authenticate the user during an initial user authentication process when information in the persistent object defining user credentials is not sufficient to authenticate the user, wherein the login controller thread, the transient object and the persistent object are managed by an operating system of the networked system, the accumulated information presented at the browser establishes the stateful environment for the stateless environment, and wherein establishing a stateful environment for a stateless environment is during the initial user authentication process such that state information is used by other processes in-between sessions, the state information accumulated during the user authentication process is available to multiple sessions initiated between a browser requesting the user authentication and a server of the networked system, wherein the login presentation thread provides to the browser a second page for presentation at the browser, the second page comprising the accumulated state information and a request for information in addition to the requested authentication information from the user for authenticating the user when the requested authentication information is insufficient to access the web server.

18. The networked system of claim 17, wherein the login controller thread further includes a plurality of modules, the plurality of modules configured to communicate the temporary information to the persistent object from the login presentation thread.

19. The networked system of claim 17, wherein the login controller thread further includes a plurality of modules, the plurality of modules configured to communicate the temporary information from the persistent object to the login presentation thread.

* * * * *